United States Patent [19]

McVeigh

[11] 3,930,724
[45] Jan. 6, 1976

[54] MASKING APPARATUS FOR A MULTI-COLOR ELECTROPHOTOGRAPHIC PRINTING MACHINE

[75] Inventor: James H. McVeigh, Rochester, N.Y.

[73] Assignee: Xerox Corporation, Stamford, Conn.

[22] Filed: Nov. 12, 1973

[21] Appl. No.: 415,276

[52] U.S. Cl. .................................................. 355/7
[51] Int. Cl. ............................................ G03g 15/04
[58] Field of Search ............................ 355/17, 7, 75

[56] References Cited
UNITED STATES PATENTS 2,523,735  9/1950  Sussin .................................... 355/75
2,890,343  6/1959  Bolton ................................. 355/7 X Primary Examiner—John M. Horan
Attorney, Agent, or Firm—H. Fleischer; C. A. Green; J. J. Ralabate

[57] ABSTRACT

This invention relates generally to a method of color reproduction and the apparatus employed therefor. More particularly, the invention concerns a method and apparatus employed in masking an original document so as to create color highlights or a color copy from a black and white or color original.

5 Claims, 2 Drawing Figures

MASKING APPARATUS FOR A MULTI-COLOR ELECTROPHOTOGRAPHIC PRINTING MACHINE

BACKGROUND OF THE INVENTION

This invention relates generally to a method of color reproduction and the apparatus employed therefor. More particularly, the invention concerns a method and apparatus employed in masking an original document so as to create color highlights or a color copy from a black and white or color original.

The process of electrophotographic printing is presently well-developed and generally employs an electrostatic latent image recorded on a photoconductive surface. Preferably, the electrostatic latent image is developed with heat settable toner particles. The toner powder image is transferred from the electrostatic latent image to a sheet of support material positioned closely adjacent thereto. Thereupon, the toner powder image is permanently affixed to the sheet of support material by the application of suitable heat thereto. Such a process is described in greater detail in U.S. Pat. No. 2,297,691 issued to Carlson in 1942.

Multi-color electrophotographic printing is substantially similar to black and white electrophotographic printing. However, rather than forming a total image of the original document, the light image is filtered producing a single color partial light image. This single color light image exposes the charged photoconductive surface to record a single color electrostatic latent image thereon. Suitable colored toner particles are then deposited on the single color electrostatic latent image to create a single color toner powder image. Thereafter, the single color toner powder image is transferred to the sheet of support material. This process is repeated a plurality of cycles with different colored light images and correspondingly colored toner particles. Each single color toner powder image is transferred to the sheet of support material in superimposed registration with the prior toner powder image. Thus, a composite multi-layered toner powder image is produced on the sheet of support material. This multi-layered toner powder image is then heated so as to be affixed permanently to the sheet of support material, thereby producing a color copy corresponding to the original document. Although the foregoing technique works satisfactorily for reproducing color copies from a color original no satisfactory approach has been developed for creating color copies from a black and white original. Frequently, only black and white originals are available and it is desired to produce a copy having highlighted areas in color thereon. Moreover, it may also be required to create a color copy from a black and white original. In addition, it is frequently necessary to mask portions of the original document so that they are not reproduced on the copy, or, in lieu thereof, to be capable of inserting various standard indicia onto copies which have been omitted from the original document. For example, it may be desirable to add a letterhead to a copy which was omitted from the original document.

Accordingly, it is the primary object of the present invention to improve the method and apparatus of electrophotographic printing so as to be capable of forming a copy having color highlights as well as inserting or deleting portions of an original document therefrom.

SUMMARY OF THE INVENTION

Briefly stated, and in accordance with the present invention there is provided an apparatus for selectively masking portions of an original document.

This is accomplished in the present instance by a substantially transparent sheet. Means are provided for holding the original document in operative communication with the transparent sheet. This enables selective portions of the original document to be masked by disposing opaque strips on the transparent sheet. After the opaque strips have been secured to the transparent sheet, moving means advance the transparent sheet into a masking relationship with the original document.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment and method of use, it will be understood that it is not intended to limit the invention to that embodiment and method of use. On the contrary, it is intended to cover all alternatives, modifications and equivalents as may be included within the spirit and scope of the invention as defined by the appended claims.

DETAILED DESCRIPTION OF THE INVENTION

Figure 1:
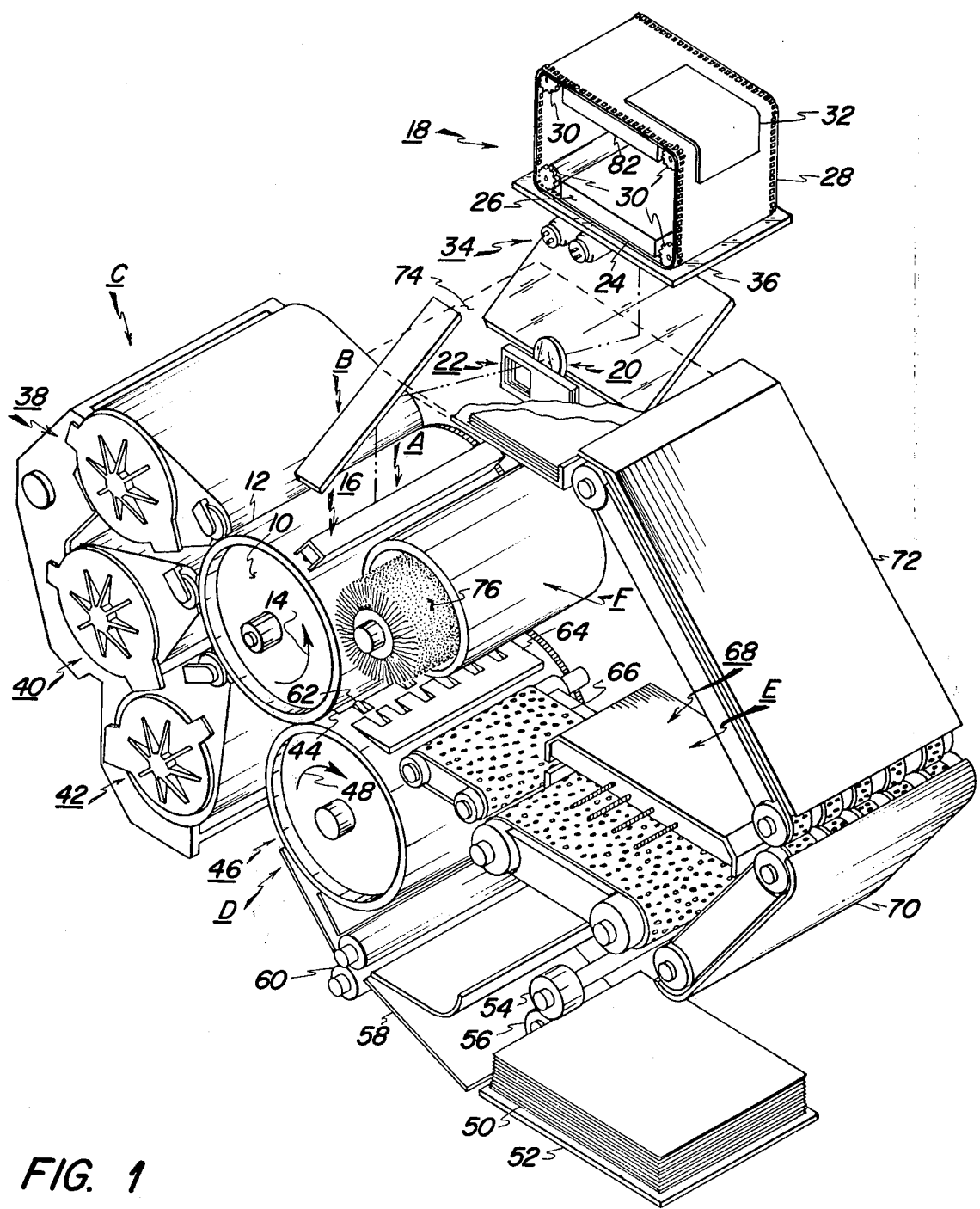
FIG. 1 is a schematic perspective view of a color electrophotographic printing machine employing the present invention therein.

For a general understanding of the disclosed multi-color electrophotographic printing machine in which the masking apparatus of the present invention may be employed, continued reference is had to the drawings. In the drawings, like reference numerals have been used throughout to designate like elements. The color electrophotographic printing machine of FIG. 1 is depicted as having the components for producing multi-color copies from an original document. The original document is positioned in the masking apparatus of the present invention. Although the masking apparatus of the present invention is particularly well adapted for use in the foregoing electrophotographic printing machine, it should become evident from the following discussion that it is equally well suited for use in a wide variety of electrostatographic printing machines and is not necessarily limited to the particular embodiment show herein.

Referring now to FIG. 1, the multi-color electrophotographic printing machine employs a drum 10 mounted rotatably within the machine frame (not shown). Drum 10 has entrained about and secured to the exterior circumferential surface thereof photoconductive surface 12. A suitable photoconductive material having a panchromatic response to white light is disclosed in U.S. Pat. No. 3,655,377 issued to Sechak in 1972. Drum 10 is rotated in the direction of arrow 14 by a drive motor (not shown) within the printing machine. In this manner, photoconductive surface 12 is advanced sequentially through a series of processing stations. Drum 10 rotates at a substantially constant angular velocity and includes a timing disc mounted in the region of one end portion thereof for triggering the machine logic to thereby coordinate the sequence of events at the various processing stations.

Initially, drum 10 rotates photoconductive surface 12 through charging station A. A corona generating device, indicated generally at 16, is positioned at charging station A. Corona generating device 16 extends in a generally longitudinal direction transversely across photoconductive surface 12. It is adapted to generate a spray of ions for charging photoconductive surface 12 to a relatively high substantially uniform potential. Preferably, corona generating device 16 is of the type described in U.S. Pat. No. 2,778,946 issued to Mayo in 1957.

After photoconductive surface 12 is charged to a substantially uniform potential, drum 10 rotates to exposure station B. At exposure station B, a colored filtered light image of the masked original document disposed in masking apparatus 18 is projected onto charged photoconductive surface 12. Exposure station B includes thereat a moving lens system, generally designated by the reference numeral 20, and a color filter mechanism, shown generally at 22. Original document 24 is positioned face down on tray 26 of masking apparatus 18. An endless belt 28 entrained about a plurality of spaced rollers 30 is adapted to move successive transparent sheets 32. Transparent sheets 32 having opaque strips thereon adapted to mask selected portions of original document 24. Masking apparatus 18 will be described hereinafter in greater detail with reference to FIG. 2. A lamp assembly, indicated generally at 34, is disposed beneath transparent platen 36 and illuminates masked original document 24 disposed thereon. Lamp assembly 34, lens 18 and color filter mechanism 22 are moved in a timed relationship with drum 10 to scan successive incremental areas of masked original document 24 disposed upon platen 36. This creates a flowing light image of masked original document 24 which is projected onto photoconductive surface 12. The irradiated areas of photoconductive surface 12 are discharged to form an electrostatic latent image thereon corresponding to masked original document 24. Filter mechanism 22 is adapted to interpose selected color filters into the optical light path. The appropriate color filter modulates the light rays passing through lens 20 to record an electrostatic latent image on photoconductive surface 12 corresponding to a preselected spectral region of the electromagnetic wave spectrum, hereinafter referred to as a single color electrostatic latent image. A suitable moving lens system is disclosed in U.S. Pat. No. 3,062,108, issued to Mayo in 1962.

Drum 10 next rotates the single color electrostatic latent image recorded on photoconductive surface 12 to development station C. At development station C, three individual developer units, generally indicated by the reference numerals 38, 40 and 42, respectively, are positioned adjacent drum 10. A suitable development station of the type illustrated in FIG. 1 is disclosed in copending application Ser. No. 255,259, filed in 1972. The individual developer units of the development system are all of the type referred to generally as magnetic brush developer units. A typical developer mix has carrier granules and toner particles therein. The developer mix is continually brought through a directional flux field to form a brush thereof. The electrostatic latent image recorded on photoconductive surface 12 is developed by bringing the brush of developer mix into contact therewith. Toner particles are attracted from the brush of developer mix to the electrostatic latent image recorded on photoconductive surface 12 forming a toner powder image thereon. Each of the respective developer units preferably contain discretely colored toner particles corresponding to the complement of the spectral region of the wave length of light transmitted through filter 22. For example, a green filtered electrostatic latent image is rendered visible by depositing green absorbing magenta toner particles on the electrostatic latent image recorded on photoconductive surface 12. Similarly, blue and red latent images are developed with yellow and cyan toner particles, respectively. However, one skilled in the art will appreciate that the present invention is not limited to the foregoing sequence of events. If desired, the electrostatic latent image recorded on photoconductive surface 12 may be developed with toner particles of noncomplementary colors.

After the single color electrostatic latent image recorded on photoconductive surface 12 is developed with suitably colored toner particles, drum 10 rotates to transfer station D. At transfer station D, the toner powder image adhering to photoconductive surface 12 is transferred to a sheet of support material 44. Support material 44 may be, amongst others, plain paper of a sheet of thermoplastic material. The transfer roll, shown generally at 46, is arranged to have support material 44 secured releasably thereto to move in a recirculating path therewith. Transfer roll 46 rotates in the direction of arrow 48 at substantially the same angular velocity as drum 10. Thus, successive single color toner powder images may be transferred from photoconductive surface 12 to support material 44. Transfer roll 46 is biased electrically to a potential of sufficient magnitude and polarity to attract electrostatically the toner powder image from photoconductive surface 12 to support material 44. A suitably electrically biased transfer roll 46 is descirbed in U.S. Pat. No. 3,612,677, issued to Langdon et al in 1971.

Prior to continuing with the description of the printing process, the sheet feeding arrangement of the printing machine depicted in FIG. 1 will be briefly discussed. Support material 44 is advanced from a stack 50 thereof disposed on a tray 52. Feed roll 54, operatively associated with retard roll 56, advances and separates the uppermost sheet from stack 50 disposed in tray 52. The advancing uppermost sheet moves into a chute 58 which directs it into the nip between register rolls 60. Register rolls 60 align the sheet and advance it to transfer roll 46. Griper fingers 62 secure releasably support material 44 to transfer roll 46. After a plurality of toner powder images have been transferred to support material 44, gripper fingers 62 space material 44 from transfer roll 46. This enables stripper bar 64 to be interposed therebetween separating support material 44 from transfer roll 46.

Continuing now with the color printing process, after support material 44 is separated from transfer roll 46, it advances on endless belt conveyor 66 to fixing station E. At fixing station E, a fuser, indicted generally at 68 permanently affixes the multi-layered toner powder image to support material 44. One type of suitable fuser is described in U.S. Pat. No. 3,498,592, issued to Moser et al. in 1970. After the fixing process, support material 34 is advanced by endless belt conveyors 70 and 72 to catch tray 74. Catch tray 74 is arranged so that the machine operator may readily remove the completed multi-color copy therefrom.

After the toner powder images have been transferred from the electrostatic image to support material 44, some residual toner particles may remain thereon. These residual toner particles are removed from photoconductive surface 12 as it passes through cleaning station F. Initially, the toner particles are brought under the influence of a cleaning corona generating device (not shown) arranged to neutralize the electrostatic charge remaining on the toner particles and photoconductive surface 12. The neutralized toner particles are then cleaned from photoconductive surface 12 by a rotatably mounted fibrous brush 76 in contact therewith. A suitable brush cleaning device is described in U.S. Pat. No. 3,590,412, issued to Gerbasi in 1971. As shown in FIG. 1, rotatably mounted brush 76 removes the residual toner particles remaining on photoconductive surface 12.

It is believed that the foregoing description is sufficient to illustrate the general operation of the multicolor electrophotographic printing machine employing the masking apparatus of the present invention.

Figure 2:
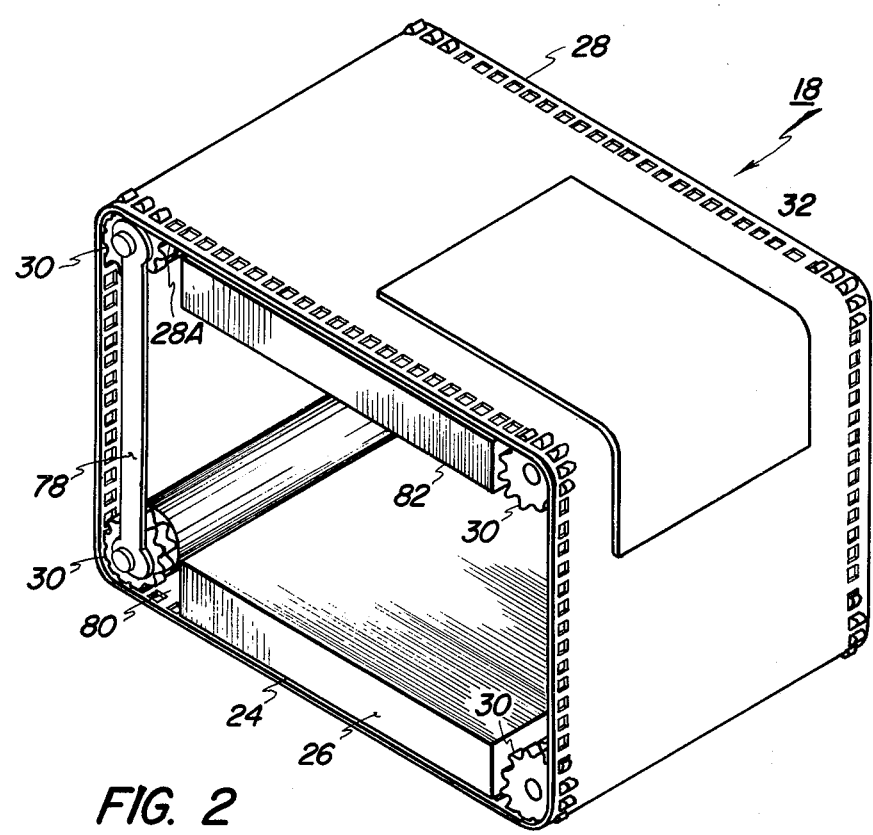
FIG. 2 is a schematic perspective view of the masking apparatus used in the FIG. 1 printing machine.

Referring to the specific subject matter of the present invention, FIG. 2 depicts schematically, in perspective, masking apparatus 18. As shown in FIG. 2, masking apparatus 18 is disposed on platen 36 of the printing machine illustrated in FIG. 1. Masking apparatus 18 includes a frame 78 supporting a plurality of spaced roller 30 mounted rotatably thereon. Endless belt 28 is entrained about rollers 30 and is adapted to be advanced thereby. Registration mark 80 is located on frame 78 so as to indicate when transparent sheet 32 is positioned properly over platen 36 and in registration with original document 34. Tray 82 is disposed beneath bottom surface 28a of endless belt 28. Tray 82 is mounted slidably in frame 78. In operation, original document 24 is initially disposed in tray 82 face up. Transparent sheet 32 is advanced over original document 24. Thereafter, the operator positions opaque strips on transparent sheet 32 so as to mask selected portions thereof. The foregoing process is repeated for successive transparent sheets so that the selected portions on original document 22 are appropriately masked. For example, if you desire to reproduce the first paragrah of an original document type with black type on a white sheet, in cyan, the second and third paragraph would be masked with an opaque non-light absorbing material. If the second paragraph is desired to be reproduced in magenta, the next successive transparent sheet 32 would have the first and third paragraph masked with white opaque strips. Finally, if it was desired to reproduce the third paragraph in yellow, the first and second paragraphs would be masked with white opaque strips. After the masked transparent sheets have been created, original document 24 is removed from tray 28 and positioned in tray 26.

Original document 24 is positioned on tray 26 face down with the back side thereof adjacent tray 26. Tray 26 is then advanced into masking apparatus 18. Tray 26 is mounted slidably in frame 78 of masking apparatus 18. The printing machine is then actuated and a suitable motor (not shown) rotates rollers 30 to advance endless belt 28 with transparent sheets 32 thereon into registration with original document 24. Transparent sheet 32 is interposed between the original document 24 and transparent platen 36. Thus, the opaque strips on transparent sheet 32 mask selected portions of original document 24 during the optical scanning thereof. The foregoing process is repeated for each successive electrostatic latent image being formed on photoconductive surface 12. In the foregoing example, the first electrostatic latent image would contain only the information of the first paragraph. Similarly, the second electrostatic latent image would contain the information of the second paragraph and the third electrostatic latent image would contain the information of the third paragraph. Each electrostatic latent image may now be developed with the appropriately colored toner particles. As previously indicated, the first electrostatic latent image would be developed with the cyan toner particles, the second electrostatic latent image would be developed with the magenta toner particles and the third electrostatic latent image would be developed with the yellow toner particles. The toner particles are then transferred to the sheet of support material 44. The first paragraph would comprise cyan toner particles, the second paragraph magenta toner particles, and the third paragraph yellow toner particles. Thereafter, the sheet of support material, with the toner powder images thereon, would be advanced to the fusing device so as to permanently affix the toner powder images to the sheet of support material. The resultant copy would be cyan, magenta and yellow. It is therefore evident that a multi-color copy has been created from a black and white original document.

In addition, it is evident that one may insert desired standard indicia onto successive copies which has been omitted from the original document. For example, if we had a black and white original lacking a letterhead, we may insert the letterhead onto transparent sheet 32. As transparent sheet 32 is interposed between original document 24 and platen 36, an electrostatic latent image will be created on photoconductive surface 12 having the indicia of the original document as well as the letterhead inscribed on transparent sheet 32. Another application is the insertion of computer created data and graphs. This data and graphs would be disposed on the masked areas so as to produce color copies thereof. In this case the computer would create the separation masks.

It, therefore, appears that there has been provided an apparatus and method for creating multi-color copies from a black and white original as well as having the capability of inserting additional information onto copies omitted from the original document. The foregoing technique is relatively simple to implement and merely requires the inclusion of the masking apparatus of the present invention into a color electrophotographic printing machine.

Thus, it is apparent that there has been provided in accordance with the present invention a masking apparatus associated with a multi-color electrophotographic printing machine that fully satisfies the objects, aims and advantages set forth above. While the present invention has been described in conjunction with a specific embodiment and method of use therefor, it is evident that many alternatives, modifications and variations will be apparent to those skilled in the art in light of the foregoing description. Accordingly, it is intended to embrace all such alternatives, modifications and variations as fall within the borad scope of the appended claims.

What is claimed is:

1. An electrophotographic printing machine of the type having an optical system arranged to create a light image of an original document which irradiates a charged photoconductive member recording an electrostatic latent image of the original documents thereon, wherein the improvement includes:
- means for supporting the original document in a light receiving relationship with the optical system;
- a substantially transparent sheet;
- means for holding the original document in operative communication with said transparent sheet to enable selective portions of the original document to be masked on said transparent sheet;
- at least one opaque substantially non-light absorbing strip adapted to be secured to said transparent sheet for masking a selected portion of the original document; and
- means for moving said transparent sheet with said opaque strip secured thereto into a masking relationship with the original document.

2. A printing machine as recited in claim 1, wherein said opaque strip contains additional indicia thereon adapted to be inserted into the original document.

3. A printing machine as recited in claim 1, wherein said moving means includes:
- a frame having a registration mark thereon;
- a plurality of spaced rollers mounted on said frame; and
- an endless belt entrained about said rollers, said endless belt being arranged to advance said transparent sheet into alignment with the registration mark on said frame.

4. A printing machine as recited in claim 3, wherein said holding means includes a tray having a generally planar surface for supporting the original document thereon, said tray being mounted slidably on said frame beneath the upper portion of said endless belt.

5. A printing machine as recited in claim 4, wherein said supporting means includes in tray having a generally planar surface for supporting the original document beneath the lower portion of said endless belt after said opaque strip has been secured to said transparent sheet, thereby enabling said transparent sheet with said opaque strip secured thereto to be interposed between the original document and the optical system of the printing machine.

* * * * *